(12) United States Patent
Monk et al.

(10) Patent No.: US 8,588,250 B2
(45) Date of Patent: *Nov. 19, 2013

(54) BROADBAND CABLE NETWORK UTILIZING COMMON BIT-LOADING

(75) Inventors: Anton Monk, San Diego, CA (US); Brett Bernath, San Diego, CA (US); Yusuf Ozturk, San Diego, CA (US); Ron Porat, La Jolla, CA (US)

(73) Assignee: Entropic Communications, Inc., San Diego, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 13/027,030

(22) Filed: Feb. 14, 2011

(65) Prior Publication Data

US 2011/0134786 A1    Jun. 9, 2011

Related U.S. Application Data

(63) Continuation of application No. 10/889,975, filed on Jul. 12, 2004, now Pat. No. 7,889,759, which is a continuation-in-part of application No. 10/778,505, filed on Feb. 13, 2004, now abandoned, which is a continuation of application No. 09/910,412, filed on Jul. 21, 2001, now Pat. No. 7,594,249, said application No. 10/889,975 is a continuation-in-part of application No. 10/332,834, filed on Dec. 18, 2002, now Pat. No. 7,295,518, which is a continuation of application No. 10/230,687, filed on Aug. 29, 2002, now abandoned.

(60) Provisional application No. 60/288,967, filed on May 4, 2001, provisional application No. 60/316,820, filed on Aug. 30, 2001, provisional application No. 60/363,420, filed on Mar. 12, 2002, provisional application No. 60/385,361, filed on Jun. 3, 2002.

(51) Int. Cl.
*H04J 3/16* (2006.01)

(52) U.S. Cl.
USPC .................... 370/465; 370/252; 455/63.1

(58) Field of Classification Search
USPC ............... 370/252, 253, 465; 375/260, 267; 455/61, 63.1, 67.11
See application file for complete search history.

(56) References Cited

U.S. PATENT DOCUMENTS

| 6,385,462 B1 * | 5/2002 | Baum et al. ............... 455/63.1 |
| 2009/0279498 A1 * | 11/2009 | Li et al. ..................... 370/329 |

* cited by examiner

*Primary Examiner* — Pao Sinkantarakorn
(74) *Attorney, Agent, or Firm* — Bruce Greenhaus; Sheppard Mullin Richter & Hampton LLP

(57) ABSTRACT

A broadband cable network ("BCN") for determining a common bit-loading modulation scheme for communicating between a plurality of nodes in the BCN is disclosed. The BCN may include a transmitting node within the plurality of nodes where the transmitting node is capable of sending a probe signal to the plurality of nodes, and at least one receiving node within the plurality of nodes in signal communication with the transmitting node. The at least one receiving node is capable of transmitting a first response signal in response to receiving the probe signal. The first response signal includes a first bit-loading modulation scheme determined by the at least one receiving node. The transmitting node is further capable of determining the common bit-loading modulation scheme from the first response signal.

24 Claims, 11 Drawing Sheets

BROADBAND CABLE NETWORK UTILIZING COMMON BIT-LOADING

REFERENCE TO EARLIER-FILED APPLICATIONS

This application is a Continuation application of U.S. application Ser. No. 10/889,975 titled "Broadband Cable Network Utilizing Common Bit-Loading," filed Jul. 12, 2004, now pending, which is a continuation-in-part of U.S. Utility application Ser. No. 10/778,505 titled "Network Interface Device and Broadband Local Area Network Using Coaxial Cable," filed Feb. 13, 2004, now abandon, which is a continuation of U.S. Utility application Ser. No. 09/910,412 titled "Network Interface Device and Broadband Local Area Network Using Coaxial Cable," filed Jul. 21, 2001, now an issued patent, U.S. Pat. No. 7,594,249 Issued on Sep. 22, 2009, which claims the benefit of U.S. Provisional Application Ser. No. 60/288,967 titled "Network Interface and Broadband Local Area Network Using Coaxial Cable," filed May 4, 2001, all of which applications are incorporated herein, in their entirety, by this reference. This application is also a continuation-in-part of U.S. Utility application Ser. No. 10/322,834 titled "Broadband Network for Coaxial Cable Using Multi-carrier Modulation," filed Dec. 18, 2002, now an issued patent, U.S. Pat. No. 7,295,518 Issued on Nov. 13, 2007, which is a continuation of U.S. Utility application Ser. No. 10/230,687 titled "Broadband Network for Coaxial Cable Using Multi-carrier Modulation," filed Aug. 29, 2002, now abandoned, which claims the benefit of the following U.S. Provisional Applications: (a) Ser. No. 60/316,820 titled "Broadband Local Area Network Using Coaxial Cable," filed Aug. 30, 2001; (b) Ser. No. 60/363,420 titled "Method of Bit and Energy Loading to Reduce Interference Effects in Devices Sharing a Communication Medium," filed Mar. 12, 2002; and (c) Ser. No. 60/385,361 titled "Power Loading to Reduce Interference Effects in Devices Sharing a Communication Medium," filed Jun. 3, 2002, all of which applications are incorporated herein, in their entirety, by this reference.

BACKGROUND OF THE INVENTION

1. Field of Invention

The invention relates to broadband communication networks, and in particular to broadband communication networks utilizing coaxial cable.

2. Related Art

The worldwide utilization of external television ("TV") antennas for receiving broadcast TV, and of cable television and satellite TV is growing at a rapid pace. These TV signals from an external TV antenna, cable TV and satellite TV (such as from direct broadcast satellite "DBS" system) are usually received externally to a building (such as a home or an office) at a point-of-entry ("POE"). There may be multiple TV receivers and/or video monitors within the building and these multiple TV receivers may be in signal communication with the POE via a broadband cable network that may include a plurality of broadband cables and broadband cable splitters. Generally, these broadband cable splitters distribute downstream signals from the POE to various terminals (also known as "nodes") in the building. The nodes may be connected to various types of customer premise equipment ("CPE") such as cable converter boxes, televisions, video monitors, cable modems, cable phones and video game consoles.

Typically, these broadband cables and broadband cable splitters are implemented utilizing coaxial cables and coaxial cable splitters, respectively. Additionally, in the case of cable TV or satellite TV, the multiple TV receivers may be in signal communication with the broadband cable network via a plurality of cable converter boxes, also known as set-top boxes ("STBs"), that are connected between the multiple TV receivers and the broadband cable network via a plurality of network nodes.

Typically, a STB connects to a coaxial cable from a network node (such as the wall outlet terminal) to receive cable TV and/or satellite TV signals. Usually, the STB receives the cable TV and/or satellite TV signals from the network node and converts them into tuned TV signals that may be received by the TV receiver and/or video signals that may be received by a video monitor.

In FIG. 1, an example known broadband cable network 100 (also known as a "cable system" and/or "cable wiring") is shown within a building 102 (also known as customer premises or "CP") such as a typical home or office. The broadband cable system 100 may be in signal communication with an optional cable service provider 104, optional broadcast TV station 106, and/or optional DBS satellite 108, via signal path 110, signal path 112 and external antenna 114, and signal path 116 and DBS antenna 118, respectively. The broadband cable system 100 also may be in signal communication with optional CPEs 120, 122 and 124, via signal paths 126, 128 and 130, respectively.

In FIG. 2, another example known broadband cable system is shown within a building (not shown) such as a typically home. The cable system 200 may be in signal communication with a cable provider (not shown), satellite TV dish (not shown), and/or external antenna (not shown) via a signal path 202 such as a main coaxial cable from the building to a cable connection switch (not shown) outside of the building. The cable system 200 may include a POE 204 and main splitter 206, a sub-splitter 208, and STBs A 210, B 212 and C 214.

Within the cable system 200, the POE 204 may be in signal communication with main splitter 206 via signal path 216. The POE 204 may be the connection point from the cable provider which is located external to the building of the cable system 200. The POE 202 may be implemented as a coaxial cable connector, transformer and/or filter.

The main splitter 206 may be in signal communication with sub-splitter 208 and STB A 210 via signal paths 218 and 220, respectively. The sub-splitter 208 may be in signal communication with STB B 212 and STB C 214 via signal paths 222 and 224, respectively. The main splitter 206 and sub-splitter 208 may be implemented as coaxial cable splitters. The STB A 210, B 212 and C 214 may be implemented by numerous well known STB coaxial units such as cable television set-top boxes and/or satellite television set-top boxes. Typically, the signal paths 202, 216, 218, 220, 222 and 224 may be implemented utilizing coaxial cables.

In an example operation, the cable system 200 would receive CATV, cable and/or satellite radio frequency ("RF") TV signals 226 via signal path 202 at the POE 204. The POE 204 may pass, transform and/or filter the received RF signals to a second RF signal 228 that may be passed to the main splitter 206 via signal path 216. The main splitter 206 may then split the second RF signal 228 into split RF signals 230 and 232. The split RF signal 230 is then passed to the sub-splitter 208 and the split RF signal 232 is passed to the STB A 210 via signal paths 218 and 220, respectively. Once the split RF signal 232 is received by the STB A 210, the STB A 210 may convert the received split RF signal 232 into a baseband signal 238 that may be passed to a video monitor (not shown) in signal communication with the STB A 210.

Once the split RF signal 230 is received by the sub-splitter 208, the sub-splitter 208 splits the received split RF signal 230 into sub-split RF signals 234 and 236 that are passed to STB B 212 and STB C 214 via signal paths 222 and 224, respectively. Once the sub-split RF signals 234 and 236 are received by the STB B 212 and STB C 214, respectively, the STB B 212 and STB C 214 may convert the received sub-split RF signals 234 and 236 into baseband signals 240 and 242, respectively, that may be passed to video monitors (not shown) in signal communication with STB B 212 and STB C 214.

As the utilization of the numbers and types of CPEs in buildings increase (such as the number of televisions, video monitors, cable modems, cable phones, video game consoles, etc., increase in a typical home or office environment), there is a growing need for different CPEs to communicate between themselves in a network type of environment within the building. As an example, users in a home may desire to play network video games between different rooms in home environment utilizing the coaxial cable network installed throughout the home. Additionally, in another example, users in a home may want to share other types of digital data (such video and/or computer information) between different rooms in a home.

Unfortunately, most broadband cable networks (such as the examples shown in both FIG. 1 and FIG. 2) presently utilized within most existing buildings are not configured to allow for easy networking between CPEs because most broadband cable networks utilize broadband cable splitters that are designed to split an incoming signal from the POE into numerous split signals that are passed to the different nodes in different rooms.

As an example, in a typical home the signal splitters are commonly coaxial cable splitters that have an input port and multiple output ports. Generally, the input port is known as a common port and the output ports are known as tap ports. These types of splitters are generally passive devices and may be constructed using lumped element circuits with discrete transformers, inductors, capacitors, and resistors and/or using strip-line or microstrip circuits. These types of splitters are generally bi-directional because they may also function as signal combiners, which sum the power from the multiple tap ports into a single output at the common port.

However, presently many CPEs utilized in modern cable and DBS systems have the ability to transmit as well as receive. If a CPE is capable of transmitting an upstream signal, the transmitted upstream signal from that CPE typically flows through the signal splitters back to the POE and to the cable and/or DBS provider. In this reverse flow direction, the signal splitters function as signal combiners for upstream signals from the CPEs to the POE. Usually, most of the energy from the upstream signals is passed from the CPEs to the POE because the splitters typically have a high level of isolation between the different connected terminals resulting in significant isolation between the various CPEs.

The isolation creates a difficult environment to network between the different CPEs because the isolation results in difficulty for transmitting two-way communication data between the different CPEs. Unfortunately, CPEs are becoming increasingly complex and a growing number of users desire to connect these multiple CPEs into different types of networks.

Therefore, there is a need for a system and method to connect a variety of CPEs into a local network, such as local-area network ("LAN"), within a building such as a home or office. Additionally, there is a need for a system and method to connect a variety of CPEs into a local network, such as a LAN, within a building such as a home or office while allowing the utilization of an existing coaxial cable network within the building.

SUMMARY

A broadband cable network ("BCN") for determining a common bit-loading modulation scheme for communicating between a plurality of nodes in the BCN is disclosed. The BCN may include a transmitting node within the plurality of nodes where the transmitting node is capable of sending a probe signal to the plurality of nodes, and at least one receiving node within the plurality of nodes in signal communication with the transmitting node. The at least one receiving node is capable of transmitting a first response signal in response to receiving the probe signal. The first response signal includes a first bit-loading modulation scheme determined by the at least one receiving node. The transmitting node is further capable of determining the common bit-loading modulation scheme from the first response signal.

The BCN may further include a sub-plurality of receiving nodes within the plurality of nodes wherein the sub-plurality of receiving nodes are capable of transmitting a sub-plurality of response signals in response to receiving the probe signal. The sub-plurality of response signals may include other bit-loading modulation schemes and each bit-loading modulation scheme may be determined by a receiving node within the sub-plurality of receiving nodes. The transmitting node may be capable of determining the common bit-loading modulation scheme from the first response signal and the sub-plurality of response signals.

As an example of operation, the BCN is capable of transmitting a probe signal from the transmitting node to the plurality of receiving nodes and receiving a plurality of response signals from the corresponding receiving nodes of the plurality of receiving nodes, wherein each of the response signals includes a bit-loading modulation scheme determined by the corresponding receiving node. The BCN is further capable of determining the common bit-loading modulation scheme from the received plurality of response signals.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
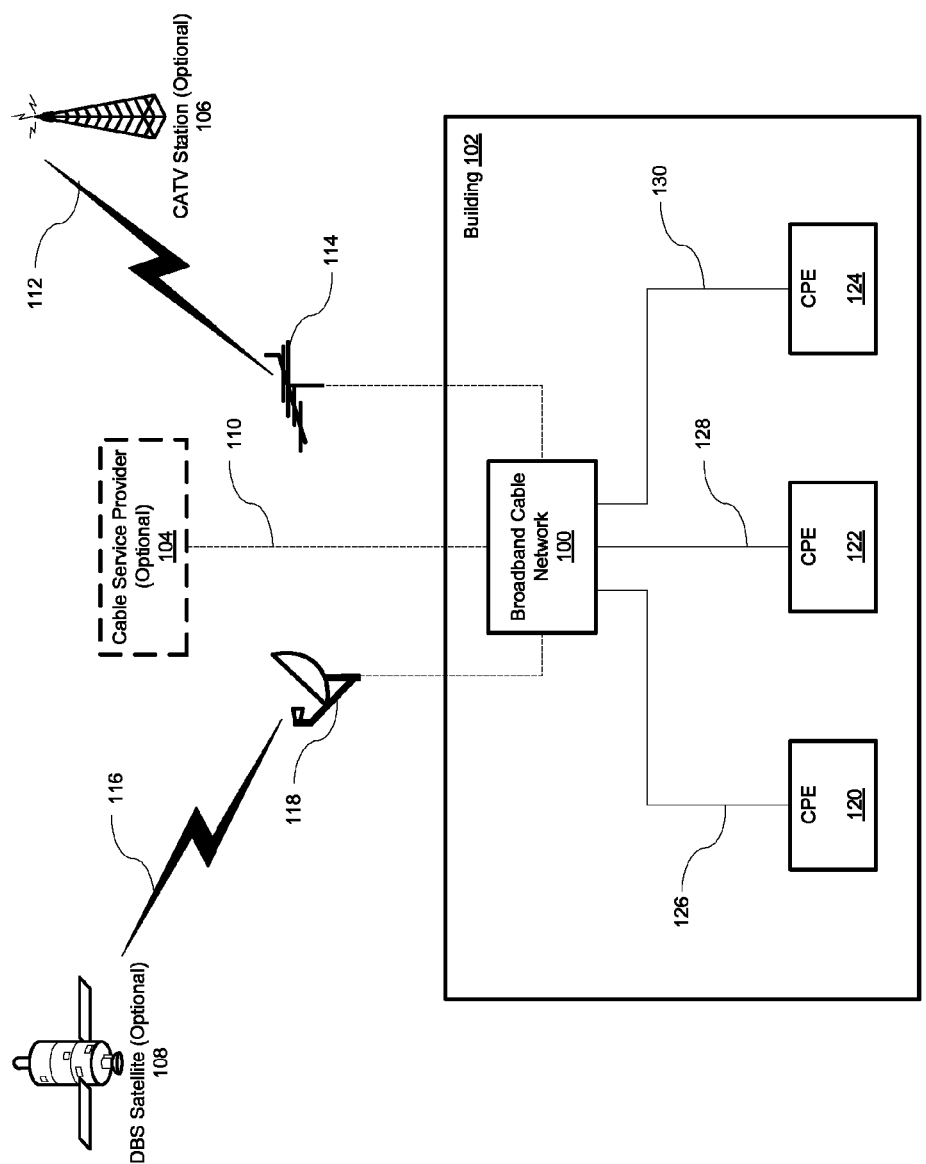
FIG. 1 shows a block diagram of an example implementation of a known broadband cable system within a building.
Figure 2:
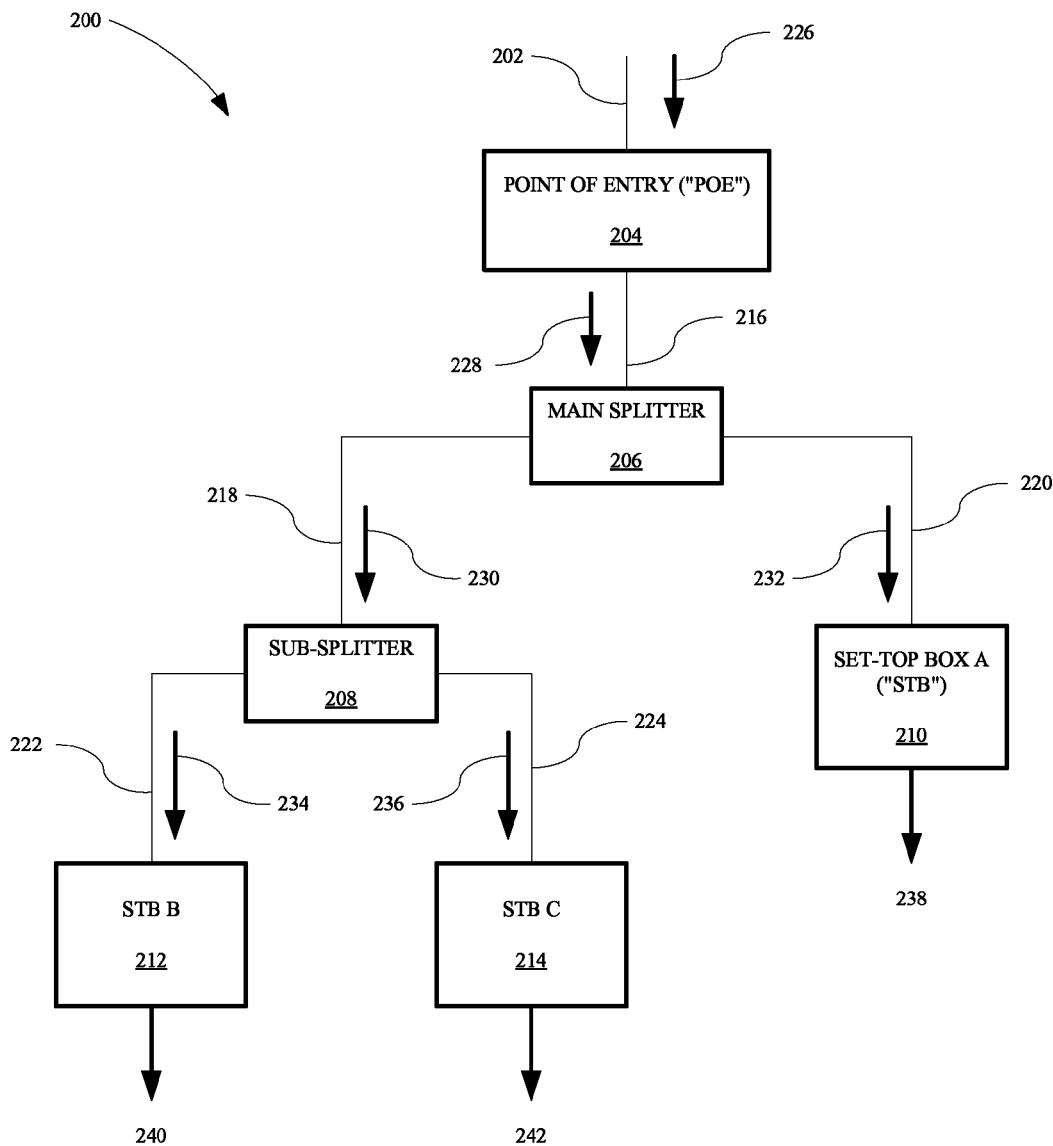
FIG. 2 shows a block diagram of another example implementation of a known broadband cable system within the building shown in FIG. 1.
Figure 3:
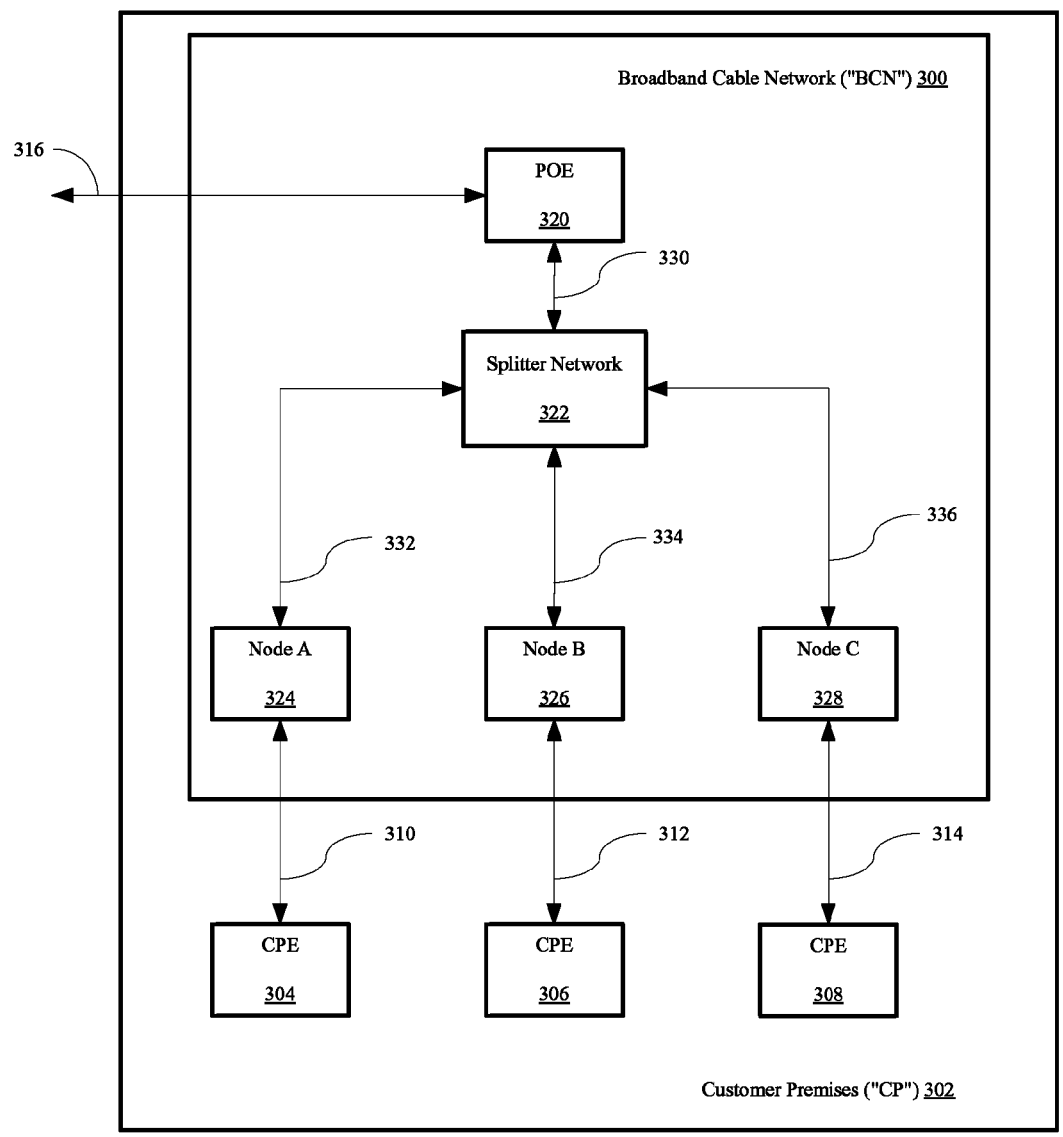
FIG. 3 shows a block diagram of an example implementation of a broadband cable network ("BCN") within a building.

In FIG. 3, a block diagram of an example implementation of a broadband cable network ("BCN") 300 utilizing common bit-loading within a customer premises ("CP") 302 is shown. The CP 302 may be a building such as a home or office having a plurality of customer premises equipment ("CPE") 304, 306 and 308 in signal communication with the BCN 300 via a plurality of corresponding CPE signal paths 310, 312 and 314. The BCN 300 may be in signal communication optionally with an external antenna (not shown), cable provider (not shown) and/or direct broadcast satellite ("DBS") provider (not shown) via external BCN path 316.

The BCN 300 may include a point-of-entry ("POE") 320, a splitter network 322 and a plurality of nodes such as node A 324, node B 326 and node C 328. The splitter network 322 may be in signal communication with the POE 320, via signal path 330, and the plurality of nodes 324, 326 and 328 via signal paths 332, 334 and 336, respectively. The nodes 324, 326 and 328 may be in signal communication with the CPEs 304, 306 and 308 via signal paths 310, 312 and 314, respectively.

In an example operation, the BCN 300 receives input radio frequency ("RF") signals from optionally the external antenna (not shown), cable provider (not shown) and/or direct broadcast satellite ("DBS") provider (not shown) at the POE 320 via external BCN path 316. The BCN 300 then passes the input RF signals from POE 320 to the splitter network 322, via signal path 330, and the splitter network 322 splits the input RF signal into split RF signals that are passed to the nodes 324, 326 and 328 via signal paths 332, 334 and 336, respectively. It is appreciated by those skilled in the art that the BCN 300 may be implemented as a coaxial cable network utilizing coaxial cables and components.

Figure 4:
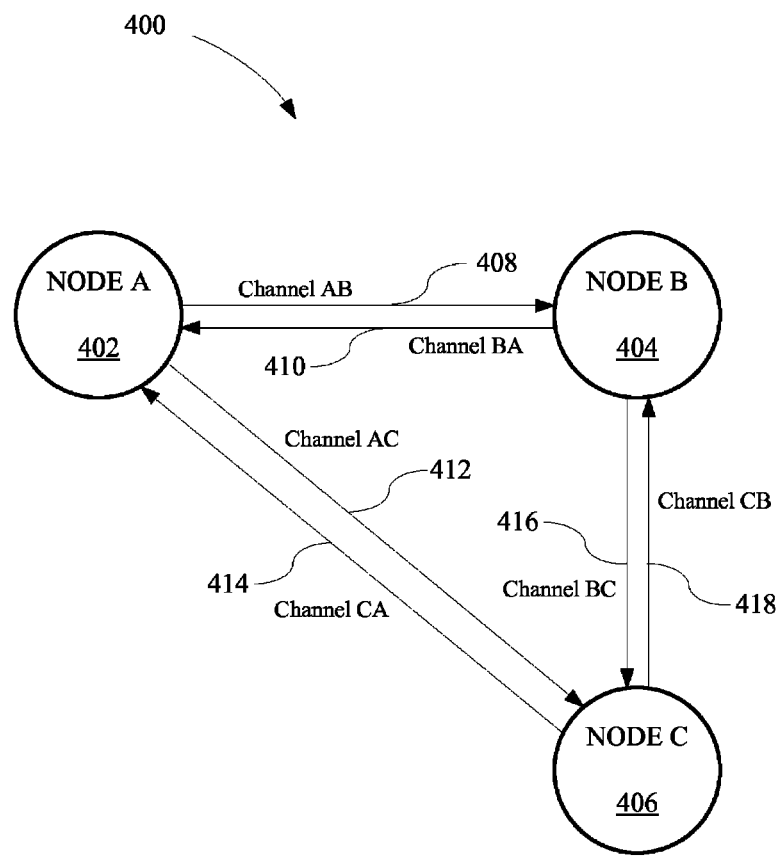
FIG. 4 shows a functional diagram showing the communication between the different nodes shown in the BCN of FIG. 3 in a unicast mode.

In FIG. 4, a functional diagram 400 showing the communication between various nodes 402, 404 and 406 corresponding to the nodes in the BCN 300, FIG. 3, is shown. The nodes 402, 404 and 406 may be interconnected between node pairs utilizing corresponding inter-node channels between the node pairs. It is appreciated by those skilled in the art that even if the nodes are individually connected with one another via a signal inter-node channel between the node pairs, each inter-node channel between node pairs may be asymmetric. Therefore, inter-node channels between node A 402, node B 404 and node C 406 may be asymmetric and therefore utilize different bit-loading modulation schemes depending on the direction of the signals between the nodes. As a result, the typically asymmetric inter-node channels between node A 402, node B 404 and node C 406 may be described by the corresponding direction-dependent node channels AB, BA, AC, CA, BC and CB.

As an example, node A 402 is in signal communication with node B 404 via signal paths 408 and 410. Signal path 408 corresponds to the AB channel and signal path 410 corresponds to the BA channel. Additionally, node A 402 is also in signal communication with node C 406 via signal paths 412 and 414. Signal path 412 corresponds to the AC channel and signal path 414 corresponds to the CA channel. Similarly, node B 404 is also in signal communication with node C 406 via signal paths 416 and 418. Signal path 416 corresponds to the BC channel and signal path 418 corresponds to the CB channel.

In this example, the AB channel corresponds to the channel utilized by node A 402 transmitting to node B 404 along signal path 408. The BA channel corresponds to the reverse channel utilized by node B 404 transmitting to node A 402 along signal path 410. Similarly, the AC channel corresponds to the channel utilized by node A 402 transmitting to node C 406 along signal path 412. The CA channel corresponds to the reverse channel utilized by node C 406 transmitting to node A 402 along signal path 414. Moreover, the BC channel corresponds to the channel utilized by node B 404 transmitting to node C 406 along signal path 416. The CB channel corresponds to the reverse channel utilized by node C 406 transmitting to node B 404 along signal path 418.

In example of operation, in order for node A 402 to transmit the same message to both node B 404 and node C 406 using the AB channel along signal path 408 and AC channel along signal path 412, node A 402 will need to transmit (i.e., "unicast") the same message twice, once to node B 404 and a second time to node C 406 because channel AB and channel AC may utilize different bit-loading modulation schemes.

Figure 5:
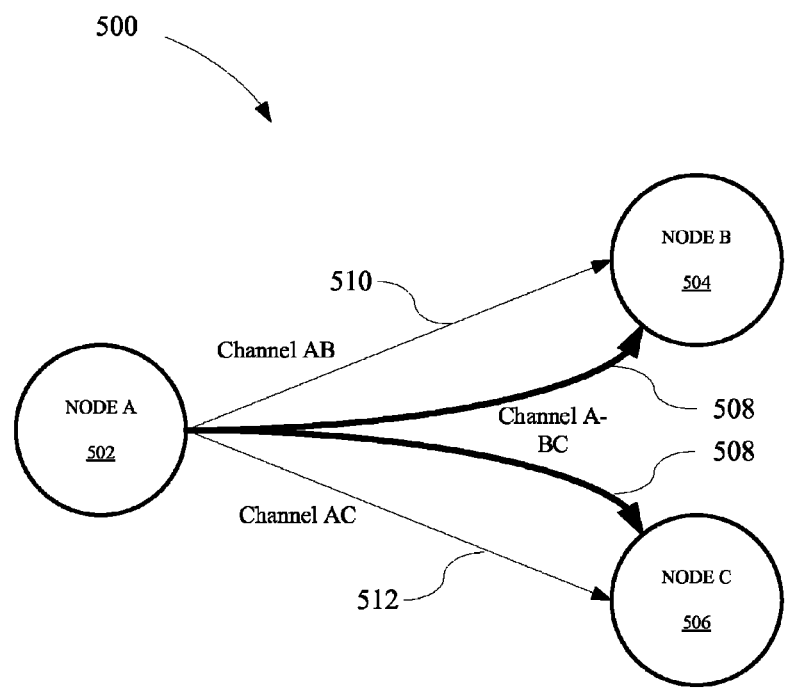
FIG. 5 shows another functional diagram showing the communication between the different nodes shown in the BCN of FIG. 3 in a broadcast mode.

In FIG. 5, another functional diagram 500 showing the communication between various nodes 502, 504 and 506 corresponding to the nodes in the BCN 300, FIG. 3, is shown. In FIG. 5, node A 502 may transmit a message in a broadcast mode (also known as a "multicast" mode) simultaneously to node B 504 and node C 506 using an A-BC channel via signal path 508. The message transmission utilizing the A-BC channel, along signal path 508, is the equivalent of simultaneously transmitting a broadcast message from node A 502 to node B 504 via an AB channel along signal path 510 and to node C 506 via an AC channel along signal path 512 in a fashion that is similar to transmission described in FIG. 4. However, in order to insure that both node B 504 and node C 506 receive the transmissions broadcast signal from node A 502, node A 502 utilizes a bit-loading modulation scheme that is known as a common bit-loaded modulation scheme. The common bit-loaded modulation scheme transmitted via the A-BC channel, along signal path 508, is a combination of the bit-loading modulation scheme transmitted via the AB channel, along signal path 510, and the AC channel, along signal path 512.

It is appreciated by those skilled in the art that the different channels typically utilize different bit-loading modulation schemes because the channels are physically and electrically different in the cable network. Physically the channels typically vary in length between nodes and electrically vary because of the paths through and reflections from the various cables, switches, terminals, connections and other electrical components in the cable network. Bit-loading is the process of optimizing the bit distribution to each of the channels to increase throughput. A bit-loading scheme is described in U.S. Utility application Ser. No. 10/322,834 titled "Broadband Network for Coaxial Cable Using Multi-carrier Modulation," filed Dec. 18, 2002, which is incorporated herein, in its entirety, by reference.

The BCN may operate with waveforms that utilize bit-loaded orthogonal frequency division multiplexing (OFDM). Therefore, the BCN may transmit multiple carrier signals (i.e., signals with different carrier frequencies) with different QAM constellations on each carrier. As an example, over a bandwidth of about 50 MHz, the BCN may have 256 different carriers which in the best circumstances would utilize up to 256 QAM modulation carriers. If instead the channel is poor, the BCN may utilize BPSK on all the carriers instead of QAM. If the channel is good in some places and poor in others, the BCN may utilize high QAM in some parts and lower types modulation in others.

Figure 6:
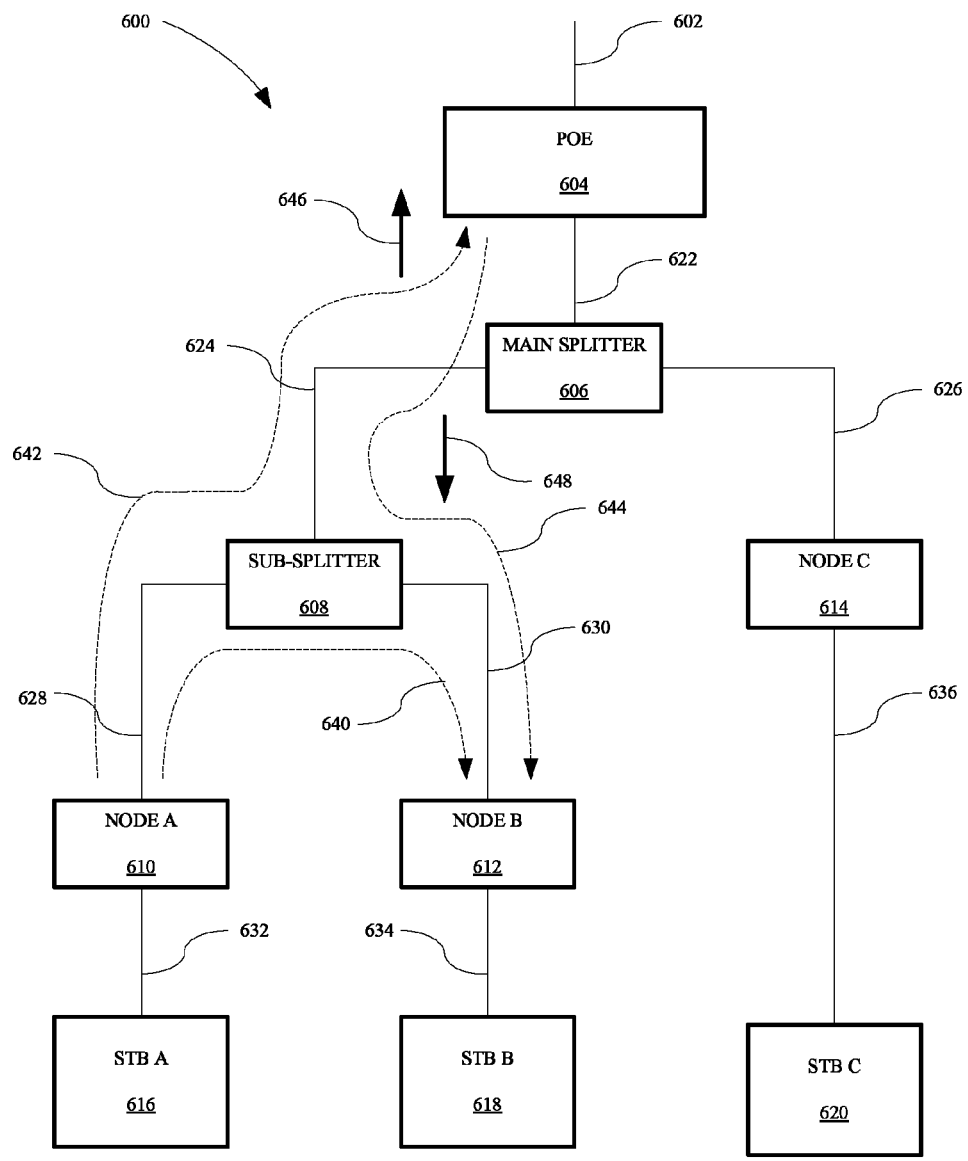
FIG. 6 shows a block diagram of an example implementation of the BCN shown in FIG. 3 when node A is communicating to node B.

As an example, in FIG. 6, a block diagram of an example implementation of the BCN 600 is shown. The BCN 600 may be in signal communication with a cable provider (not shown), satellite TV dish (not shown), and/or external antenna (not shown) via a signal path 602 such as a main coaxial cable from the customer premises to a cable connection switch (not shown) outside of the customer premises.

The BCN 600 may include a POE 604 and main splitter 606, a sub-splitter 608, nodes A 610, B 612 and C 614, and STBs A 616, B 618 and C 620. Within the BCN 600, the POE 604 may be in signal communication with main splitter 606 via signal path 622. The POE 604 may be the connection point from the cable provider which is located external to the customer premises of the BCN 600. The POE 604 may be implemented as a coaxial cable connector, transformer and/or filter.

The main splitter 606 may be in signal communication with sub-splitter 608 and node C 614 via signal paths 624 and 626, respectively. The sub-splitter 608 may be in signal communication with node A 610 and node B 612 via signal paths 628 and 630, respectively. The main splitter 606 and sub-splitter 608 may be implemented as coaxial cable splitters. Node A 610 may be in signal communication with STB A 616 via signal path 632. Similarly, node B 612 may be in signal communication with STB B 618 via signal path 634. Moreover, node C 614 may be in signal communication with STB C 620 via signal path 636. STBs A 616, B 618 and C 620 may be implemented by numerous well known STB coaxial units such as cable television set-top boxes and/or satellite television set-top boxes. Typically, the signal paths 602, 622, 624, 626, 628, 630, 632, 634 and 636 may be implemented utilizing coaxial cables.

As an example of operation, if node A 610 transmits a message to node B 612, the message will propagate through two transmission paths from node A 610 to node B 612. The first transmission path 640 travels from node A 610 through signal path 628, sub-splitter 608 and signal path 630 to node B 612. The second transmission path includes transmission sub-paths 642 and 644. The first sub-path 642 travels from node A 610 through signal path 628, sub-splitter 608, signal path 624, main splitter 606 and signal path 622 to POE 604. The second sub-path 644 travels from POE 604, through signal path 622, main splitter 606, signal path 624, sub-splitter 608 and signal path 630.

The first transmission path 640 is typically very lossy and experiences a high amount of attenuation because of the isolation between the outputs of sub-splitter 608. The second transmission path, however, does not experience the attenuation of the first transmission path 640. The second transmission path results from the transmission of message signal 646 from node A 610 to the POE 604 along the first sub-path 642 which results in a reflected message signal 648 from the POE 604. The reflected message signal 648 results from impedance mismatches between the POE 604 and the rest of the BCN 600.

Figure 7:
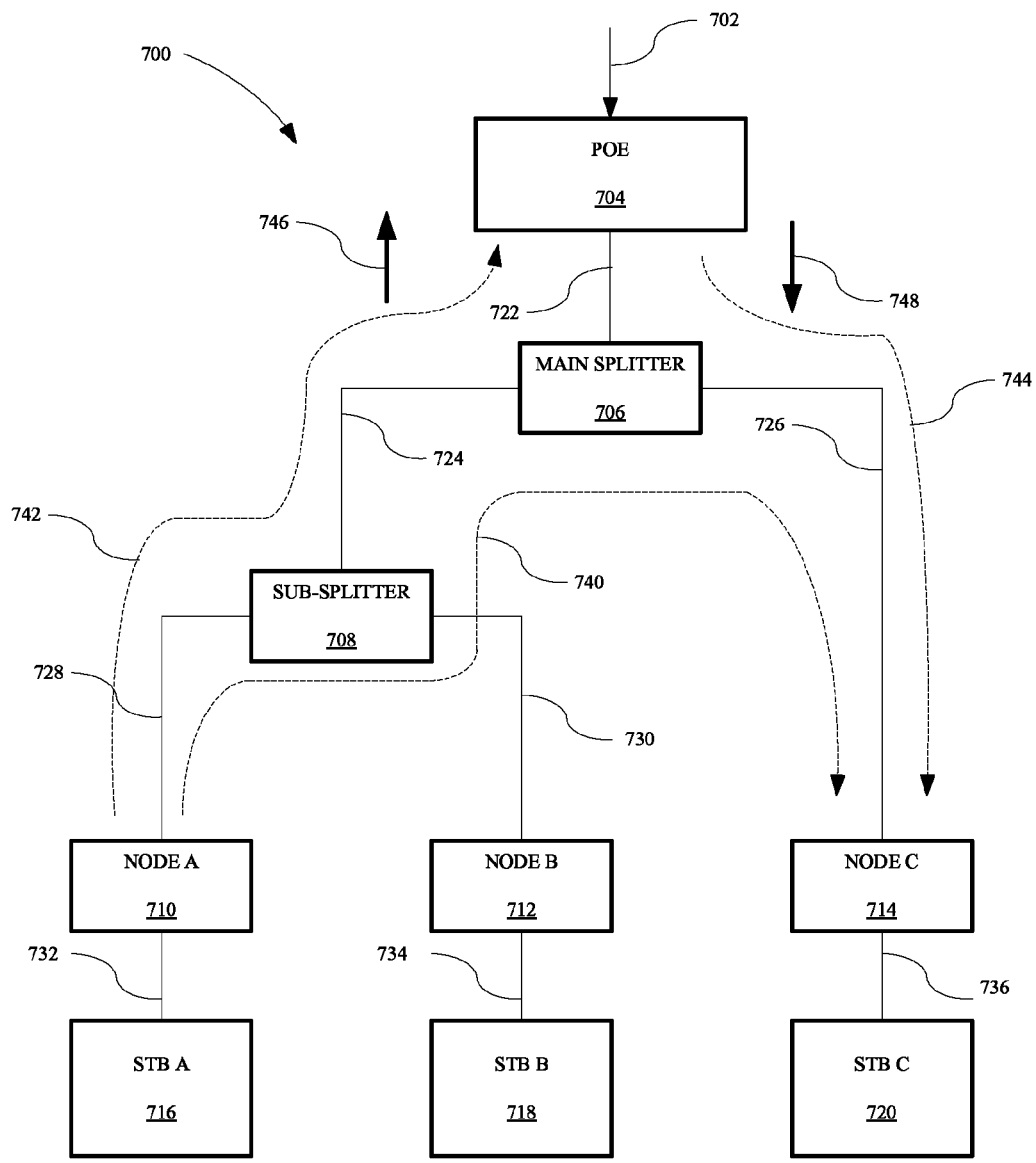
FIG. 7 shows a block diagram of another example implementation of the BCN shown in FIG. 3 when node A is communicating to node C.

As another example, in FIG. 7, another block diagram of an example implementation of the BCN 700 is shown. Similar to FIG. 6, in FIG. 7, the BCN 700 may be in signal communication with a cable provider (not shown), satellite TV dish (not shown), and/or external antenna (not shown) via a signal path 702 such as a main coaxial cable from the customer premises to a cable connection switch (not shown) outside of the customer premises.

The BCN 700 may include a POE 704 and main splitter 706, a sub-splitter 708, nodes A 710, B 712 and C 714, and STBs A 716, B 718 and C 720. Within the BCN 700, the POE 704 may be in signal communication with main splitter 706 via signal path 722. The POE 704 may be the connection point from the cable provider which is located external to the customer premises of the BCN 700. The POE 704 may be implemented as a coaxial cable connector, transformer and/or filter.

The main splitter 706 may be in signal communication with sub-splitter 708 and node C 714 via signal paths 724 and 726, respectively. The sub-splitter 708 may be in signal communication with node A 710 and node B 712 via signal paths 728 and 730, respectively. The main splitter 706 and sub-splitter 708 may be implemented as coaxial cable splitters. Node A 710 may be in signal communication with STB A 716 via signal path 732. Similarly, node B 712 may be in signal communication with STB B 718 via signal path 734. Moreover, node C 714 may be in signal communication with STB C 720 via signal path 736. STBs A 716, B 718 and C 720 may be implemented by numerous well known STB coaxial units such as cable television set-top boxes and/or satellite television set-top boxes. Typically, the signal paths 702, 722, 724, 726, 728, 730, 732, 734 and 736 may be implemented utilizing coaxial cables.

As an example of operation, if node A 710 transmits a message to node C 714, the message will propagate through two transmission paths from node A 710 to node C 714. The first transmission path 740 travels from node A 710 through signal path 728, sub-splitter 708, signal path 724, main splitter 706 and signal path 726 to node C 714. The second transmission path includes transmission sub-paths 742 and 744. The first sub-path 742 travels from node A 710 through signal path 728, sub-splitter 708, signal path 724, main splitter 706 and signal path 722 to POE 704. The second sub-path 744 travels from POE 704, through signal path 722, main splitter 706, and signal path 726 to node C 714.

The first transmission path 740 is typically very lossy and experiences a high amount of attenuation because of the isolation between the outputs of sub-splitter 708 and main splitter 706. The second transmission path, however, does not experience the attenuation of the first transmission path 740. The second transmission path results from the transmission of message signal 746 from node A 710 to the POE 704 along the first sub-path 742 which results in a reflected message signal 748 from the POE 704. The reflected message signal 748 results from mismatches between the POE 704 and the rest of the BCN 700.

Figure 8:
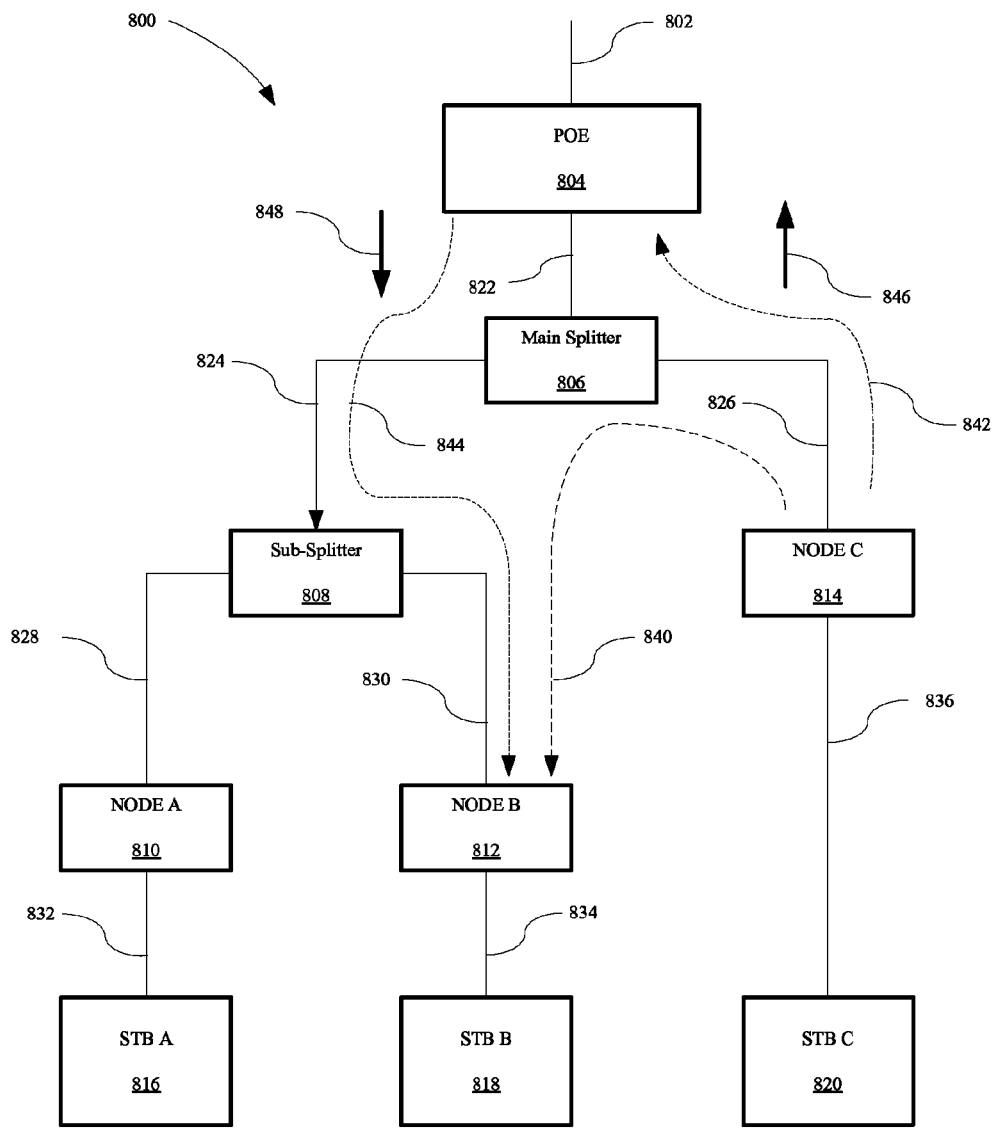
FIG. 8 shows a block diagram of an example implementation of the BCN shown in FIG. 3 when node C is communicating to node B.

As still another example, in FIG. 8, another block diagram of an example implementation of the BCN 800 is shown. Similar to FIGS. 6 and 7, in FIG. 8, the BCN 800 may be in signal communication with a cable provider (not shown), satellite TV dish (not shown), and/or external antenna (not shown) via a signal path 802 such as a main coaxial cable from the customer premises to a cable connection switch (not shown) outside of the customer premises.

The BCN 800 may include a POE 804 and main splitter 806, a sub-splitter 808, nodes A 810, B 812 and C 814, and STBs A 816, B 818 and C 820. Within the BCN 800, the POE 804 may be in signal communication with main splitter 806 via signal path 822. The POE 804 may be the connection point from the cable provider which is located external to the customer premises of the BCN 800. The POE 804 may be implemented as a coaxial cable connector, transformer and/or filter.

The main splitter 806 may be in signal communication with sub-splitter 808 and node C 814 via signal paths 824 and 826, respectively. The sub-splitter 808 may be in signal communication with node A 810 and node B 812 via signal paths 828 and 830, respectively. The main splitter 806 and sub-splitter 808 may be implemented as coaxial cable splitters. Node A 810 may be in signal communication with STB A 816 via signal path 832. Similarly, node B 812 may be in signal communication with STB B 818 via signal path 834. Moreover, node C 814 may be in signal communication with STB C 820 via signal path 836. STBs A 816, B 818 and C 820 may be implemented by numerous well known STB coaxial units such as cable television set-top boxes and/or satellite television set-top boxes. Typically, the signal paths 802, 822, 824, 826, 828, 830, 832, 834 and 836 may be implemented utilizing coaxial cables.

As an example of operation, if node C 814 transmits a message to node B 812, the message will propagate through two transmission paths from node C 814 to node B 812. The first transmission path 840 travels from node C 814 through signal path 826, main splitter 806, signal path 824, sub-splitter 808 and signal path 830 to node B 812. The second transmission path includes two transmission sub-paths 842 and 844. The first sub-path 842 travels from node C 814 through signal path 826, main splitter 806, and signal path 822 to POE 804. The second sub-path 844 travels from POE 804, through signal path 822, main splitter 806, signal path 824, sub-splitter 808 and signal path 830 to node B 812.

The first transmission path 840 is typically very lossy and experiences a high amount of attenuation because of the isolation between the outputs of sub-splitter 808 and main splitter 806. The second transmission path, however, does not experience the attenuation of the first transmission path 840. The second transmission path results from the transmission of message signal 846 from node C 814 to the POE 804 along the first sub-path 842 which results in a reflected message signal 848 from the POE 804. The reflected message signal 848 results from mismatches between the POE 804 and rest of the BCN 800.

Figure 9:
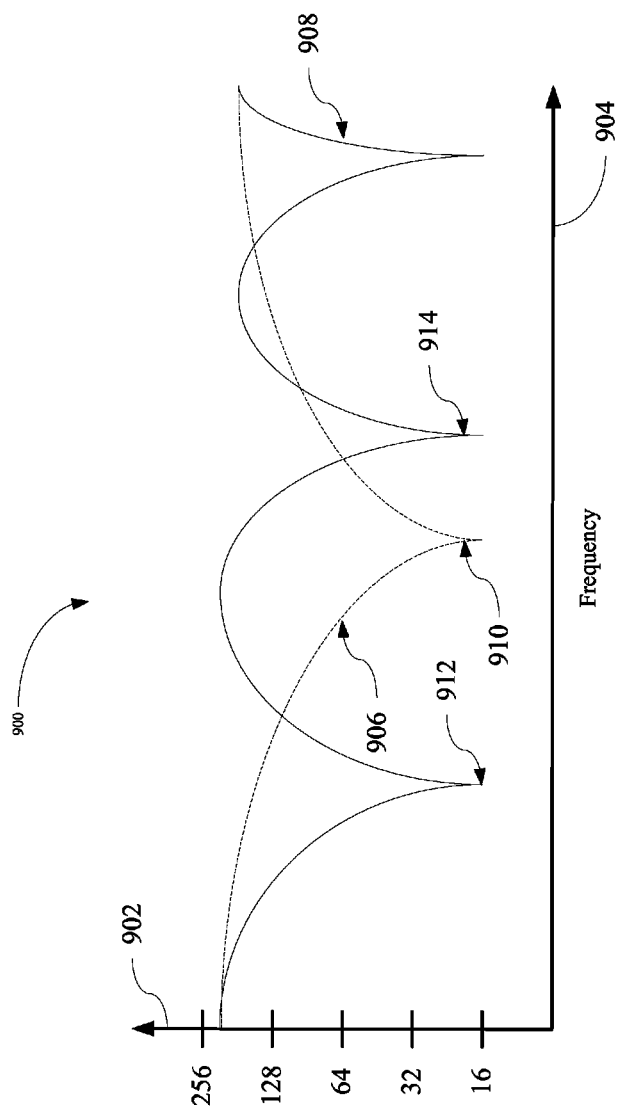
FIG. 9 shows a plot of the transfer function versus frequency for the channel path between node A and node B and the channel path between node A and node C shown in both FIGS. 6 and 7.

In FIG. 9, a plot 900 of the maximum bit-loading constellation 902 versus frequency 904 is shown for the channel path utilized by node A to transmit to node B and the channel path utilized by node A to transmit to node C. Line 906 represents the AB channel and line 908 represents the AC channel. The AB channel has a null 910 that represents the reflection distance from the POE to node B. The AC channel has nulls 912 and 914. Null 912 represents the reflection distance from the POE to node C and null 914 represents a harmonic that is a multiple value of the value of null 912. In general, the nulls are caused by the properties, e.g., amplitudes and time delays, that are unique to each transmission path in the network.

Returning to FIG. 5, the BCN, in order to insure that both node B 504 and node C 506 are able to receive a broadcast signal transmitted from node A 502, utilizes a bit-loading modulation scheme that is known as the common bit-loaded modulation scheme. The common bit-loaded modulation scheme transmitted via the A-BC channel, along signal path 508, is a combination of the bit-loading modulation scheme transmitted via the AB channel, along signal path 510, and the AC channel, along signal path 512.

Figure 10A:
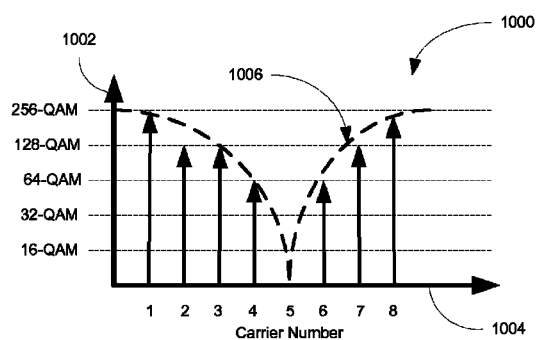
FIG. 10A shows a plot of the bit-loading constellation versus carrier number for the channel path between node A and node B shown in FIG. 9.

Therefore, in FIG. 10A, a plot 1000 of carrier frequency signals of various bit-loading constellations 1002 versus carrier number 1004 for the AB channel path between node A and node B is shown. Line 1006 represents the AB channel and follows an envelope of the constellation sizes of the 8 different carrier number signals within the AB channel. As an example, within the AB channel carrier number signals 1 and 8 may transmit at a constellation size of 256 QAM, carrier number signals 2, 3 and 7 may transmit at a constellation size of 128 QAM, carrier number signals 4 and 6 may transmit at a constellation size of 64 QAM, and carrier number signal 5 may be OFF (i.e., no carrier signal of any constellation size may be transmitted because of the null in the channel characteristics).

Figure 10B:
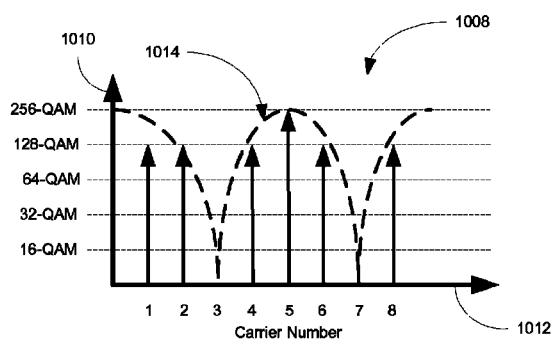
FIG. 10B shows a plot of the bit-loading constellation versus carrier number for the channel path between node A and node C shown in FIG. 9.

Similarly in FIG. 10B, a plot 1008 of carrier frequency signals of various bit-loading constellations 1010 versus carrier number 1012 for the AC channel path between node A and node C is shown. Line 1014 represents the AC channel and follows an envelope of the constellation sizes of the 8 different carrier number signals within the AC channel. As an example, within the AC channel carrier number signals 1, 2, 4, 6 and 8 may transmit at a constellation size of 128 QAM, carrier number signal 5 may transmit at a constellation size of 256 QAM, and carrier number signals 3 and 7 may be OFF (again, no carrier signals may be transmitted because of nulls in the channel characteristics).

Figure 10C:
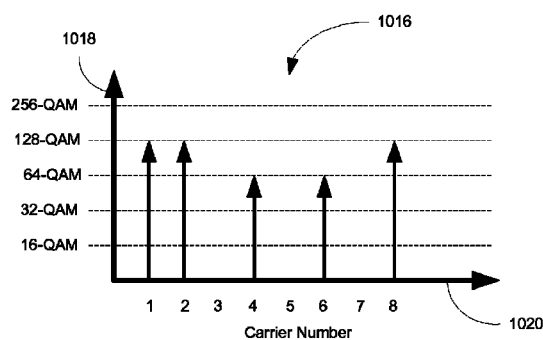
FIG. 10C shows a plot of the bit-loading constellation versus carrier number for the resulting broadcast channel path between node A and node B and node A and node C based on the constellations shown in FIGS. 10A and 10B.

In FIG. 10C, a plot 1016 of the common carrier frequency signals of various bit-loading constellations 1018 versus carrier number 1020 for the A-BC channel path between node A and nodes B and C is shown. In this example, plot 1016 shows that within the A-BC channel, carrier number signals 1, 2 and 8 may transmit at a constellation size of 128 QAM, carrier number signals 4 and 6 may transmit at a constellation size of 64 QAM, and carrier number signals 3, 5 and 7 are OFF. These carrier number signal values are the result of comparing the carrier number signals from the AB channel in FIG. 10A and the corresponding carrier number signals from the AC channel in FIG. 10B and choosing the lowest corresponding modulation value for each carrier number. The resulting common carrier frequency signals in FIG. 10C graphically represent signals utilizing the common bit-loaded modulation scheme. These signals would be able to transmit information from node A to node B and node C simultaneously.

Figure 11:
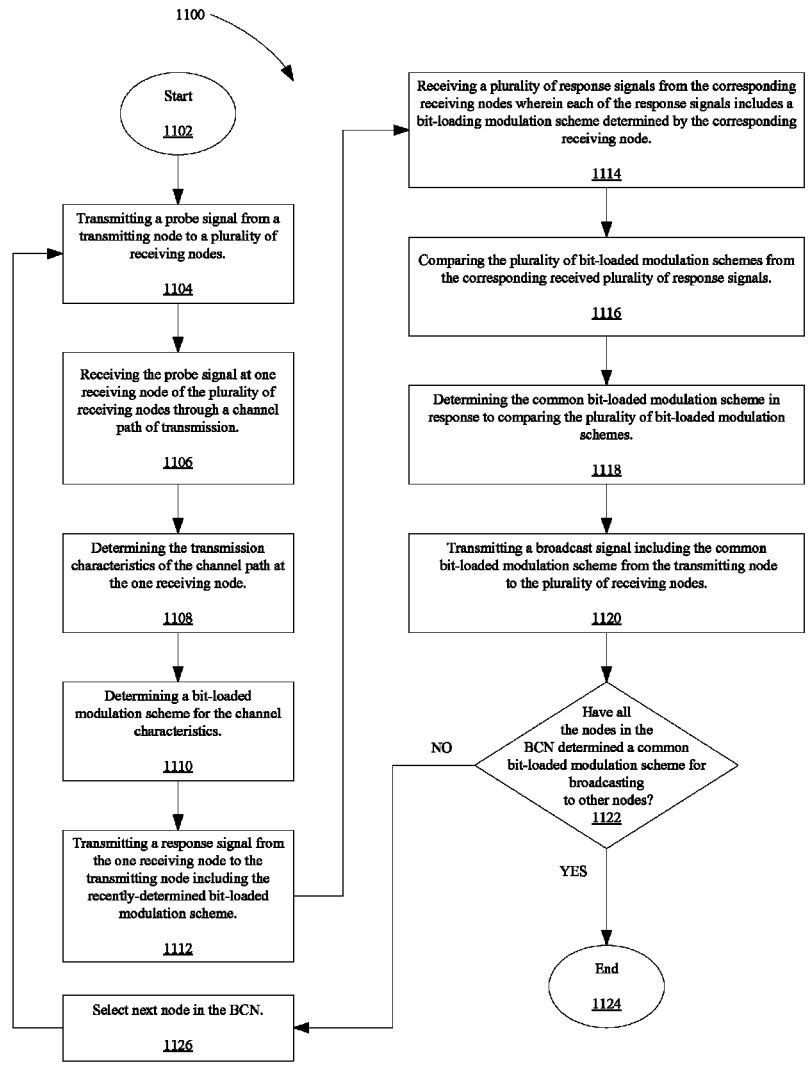
FIG. 11 shows a flowchart illustrating the method performed by the BCN shown in FIG. 3.

FIG. 11 shows a flowchart 1100 illustrating the method performed by the BCN shown in FIG. 3. In FIG. 11, the process starts in step 1102. In step 1104, a transmitting node transmits a probe signal from the transmitting node to a plurality of receiving nodes. In response, the receiving nodes receive the probe signal from the transmitting node. In step 1106, a receiving node of the plurality of receiving nodes receives the probe signal through the appropriate channel path of transmission. The receiving node then determines the transmission characteristics of the channel path from the transmitting node to the receiving node in step 1108 and in response to the determined transmission characteristics of the channel path, the receiving node determines a bit-loaded modulation scheme for the transmission characteristics of the channel path in step 1110. It is appreciate by those skilled in the art that the transmission characteristics of the channel path may be determined by measuring the metric values of the channel path. Examples of the metric values may include the signal-to-noise ratio (also known as the "SNR" and "S/N") and/or the bit-error rate ("BER") or product error rate (PER), or power level or similar measurement of the received signal at the corresponding remote device. Additionally, other signal performance metric values are also possible without departing from the scope of the invention.

The receiving node then, in step 1112, transmits a response signal to the transmitting node, informing the transmitting node of the recently-determined bit-loaded modulation scheme.

The transmitting node then receives a plurality of response signals, in step 1114, from the corresponding receiving nodes wherein each of the response signals informs the transmitting node of the corresponding bit-loaded modulation scheme determined by each of the plurality of receiving nodes. In response to receiving the plurality of response signals, the transmitting node, in step 1116, compares the plurality of bit-loaded modulation schemes from the corresponding received plurality of response signals and, in step 1118, determines the common bit-loaded modulation scheme. Once the transmitting node determines the common bit-loaded modulation scheme, the transmitting node, in step 1120, transmits a broadcast signal relaying the common bit-loaded modulation scheme to the plurality of receiving nodes. This broadcast signal may either contain handshake information from the transmitting node to the plurality of receiving nodes or it may actually be a communication message containing information such as video, music, voice and/or other data.

In decision step 1122, if all the nodes in BCN have performed the handshake process that determines the common bit-loaded modulation scheme in steps 1102 through 1120, the handshake process is complete and process ends in step 1124, at which time the BCN may begin to freely transmit information between the various nodes. If instead, there are still nodes in the BCN that have not performed the handshake process that determines the common bit-loaded modulation scheme in steps 1102 through 1120, the process then returns to step 1126. In step 1126, the BCN selects the next node in the BCN and the process steps 1102 to 1122 repeat again. Once all the nodes in the BCN have preformed the handshake process, the handshake process is complete and process ends in step 1124 at which time the BCN may begin to freely transmit information between the various nodes.

The process in FIG. 11 may be performed by hardware or software. If the process is performed by software, the software may reside in software memory (not shown) in the BCN. The software in software memory may include an ordered listing of executable instructions for implementing logical functions (i.e., "logic" that may be implemented either in digital form such as digital circuitry or source code or in analog form such as analog circuitry or an analog source such as an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, that is "a non-exhaustive list" of the computer-readable media, would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

While various embodiments of the invention have been described, it will be apparent to those of ordinary skill in the art that many more embodiments and implementations are possible that are within the scope of this invention.

What is claimed is:

1. A method for determining a common bit-loading modulation scheme for communicating between a plurality of nodes in a broadband cable network ("BCN"), the method comprising:

transmitting a probe signal from a transmitting node within the plurality of nodes to a sub-plurality of receiving nodes within the plurality of nodes;

receiving a plurality of response signals from the sub-plurality of receiving nodes wherein each response signal includes a bit-loading modulation scheme determined by a corresponding receiving node;

determining the common bit-loading modulation scheme from the received plurality of response signals;

receiving the probe signal at one receiving node of the plurality of receiving nodes through a channel path of transmission;

determining the transmission characteristics of the channel path at the one receiving node;

transmitting a response signal from the one receiving node to the transmitting node;

generating the response signal, wherein the response signal utilizes a bit-loading modulation scheme that is generated by the one receiving node in response to determining the transmission characteristics of the channel path; and transmitting a broadcast signal from the transmitting node to the plurality of receiving nodes, wherein the broadcast signal utilizes the common bit-loaded modulation scheme;

wherein the transmission characteristics of the channel path are determined by measuring the bit-error rate ("BER") characteristics of the received probe signal at the one receiving node, and wherein determining a common bit-loading modulation scheme includes:

comparing a plurality of bit-loading modulation schemes from the corresponding received plurality of response signals, and determining the common bit-loading modulation scheme in response to comparing the plurality of bit-loaded modulation schemes.

2. A method for determining a common bit-loading modulation scheme for communicating between a plurality of nodes in a broadband cable network ("BCN"), the method comprising:
   transmitting a probe signal from a transmitting node within the plurality of nodes to a sub-plurality of receiving nodes within the plurality of nodes;
   receiving a plurality of response signals from the sub-plurality of receiving nodes wherein each response signal includes a bit-loading modulation scheme determined by a corresponding receiving node;
   determining the common bit-loading modulation scheme from the received plurality of response signals;
   receiving the probe signal at one receiving node of the plurality of receiving nodes through a channel path of transmission;
   determining the transmission characteristics of the channel path at the one receiving node;
   transmitting a response signal from the one receiving node to the transmitting node; and
   generating the response signal, wherein the response signal utilizes a bit-loading modulation scheme that is generated by the one receiving node in response to determining the transmission characteristics of the channel path;
   wherein the transmission characteristics of the channel path are determined by measuring the bit-error rate ("BER") characteristics of the received probe signal at the one receiving node,
   wherein determining a common bit-loading modulation scheme includes:
      comparing a plurality of bit-loading modulation schemes from the corresponding received plurality of response signals, and
      determining the common bit-loading modulation scheme in response to comparing the plurality of bit-loaded modulation schemes; and
   wherein the probe signal utilizes a bit-loaded modulation scheme that is capable of being received by all the receiving nodes within the sub-plurality of receiving nodes.

3. A method for determining a common bit-loading modulation scheme for communicating between a plurality of nodes in a broadband cable network ("BCN"), the method comprising:
   transmitting a probe signal from a transmitting node within the plurality of nodes to a sub-plurality of receiving nodes within the plurality of nodes;
   receiving a plurality of response signals from the sub-plurality of receiving nodes wherein each response signal includes a bit-loading modulation scheme determined by a corresponding receiving node;
   determining the common bit-loading modulation scheme from the received plurality of response signals;
   receiving the probe signal at one receiving node of the plurality of receiving nodes through a channel path of transmission;
   determining the transmission characteristics of the channel path at the one receiving node;
   transmitting a response signal from the one receiving node to the transmitting node; and
   generating the response signal, wherein the response signal utilizes a bit-loading modulation scheme that is generated by the one receiving node in response to determining the transmission characteristics of the channel path;
   wherein the transmission characteristics of the channel path are determined by measuring the bit-error rate ("BER") characteristics of the received probe signal at the one receiving node;
   wherein determining a common bit-loading modulation scheme includes:
      comparing a plurality of bit-loading modulation schemes from the corresponding received plurality of response signals, and
      determining the common bit-loading modulation scheme in response to comparing the plurality of bit-loaded modulation schemes;
   wherein the probe signal utilizes a bit-loaded modulation scheme that is capable of being received by all the receiving nodes within the sub-plurality of receiving nodes; and
   wherein the transmission characteristics of the channel path are determined by measuring the signal-to-noise ("SNR") characteristics of the received probe signal at the one receiving node.

4. A method for determining a common bit-loading modulation scheme for communicating between a plurality of nodes in a broadband cable network ("BCN"), the method comprising:
   transmitting a probe signal from a transmitting node within the plurality of nodes to a sub-plurality of receiving nodes within the plurality of nodes;
   receiving a plurality of response signals from the sub-plurality of receiving nodes wherein each response signal includes a bit-loading modulation scheme determined by a corresponding receiving node;
   determining the common bit-loading modulation scheme from the received plurality of response signals;
   receiving the probe signal at one receiving node of the plurality of receiving nodes through a channel path of transmission;
   determining the transmission characteristics of the channel path at the one receiving node; and
   transmitting a response signal from the one receiving node to the transmitting node; and
   generating the response signal, wherein the response signal utilizes a bit-loading modulation scheme that is generated by the one receiving node in response to determining the transmission characteristics of the channel path;
   wherein the transmission characteristics of the channel path are determined by measuring the bit-error rate ("BER") characteristics of the received probe signal at the one receiving node;
   wherein determining a common bit-loading modulation scheme includes:
      comparing a plurality of bit-loading modulation schemes from the corresponding received plurality of response signals, and
      determining the common bit-loading modulation scheme in response to comparing the plurality of bit-loaded modulation schemes;
   wherein the probe signal utilizes a bit-loaded modulation scheme that is capable of being received by all the receiving nodes within the sub-plurality of receiving nodes; and
   wherein the transmission characteristics of the channel path are determined by measuring the product-error rate ("PER") characteristics of the received probe signal at the one receiving node.

5. A method for determining a common bit-loading modulation scheme for communicating between a plurality of nodes in a broadband cable network ("BCN"), the method comprising:
  transmitting a probe signal from a transmitting node within the plurality of nodes to a sub-plurality of receiving nodes within the plurality of nodes;
  receiving a plurality of response signals from the sub-plurality of receiving nodes wherein each response signal includes a bit-loading modulation scheme determined by a corresponding receiving node;
  determining the common bit-loading modulation scheme from the received plurality of response signals;
  receiving the probe signal at one receiving node of the plurality of receiving nodes through a channel path of transmission;
  determining the transmission characteristics of the channel path at the one receiving node;
  transmitting a response signal from the one receiving node to the transmitting node; and
  generating the response signal, wherein the response signal utilizes a bit-loading modulation scheme that is generated by the one receiving node in response to determining the transmission characteristics of the channel path;
  wherein the transmission characteristics of the channel path are determined by measuring the bit-error rate ("BER") characteristics of the received probe signal at the one receiving node;
  wherein determining a common bit-loading modulation scheme includes:
    comparing a plurality of bit-loading modulation schemes from the corresponding received plurality of response signals, and
    determining the common bit-loading modulation scheme in response to comparing the plurality of bit-loaded modulation schemes; and
  wherein each bit-loading modulation scheme utilizes a quadrature phase shift keying ("QPSK") modulation scheme.

6. A method for determining a common bit-loading modulation scheme for communicating between a plurality of nodes in a broadband cable network ("BCN"), the method comprising:
  transmitting a probe signal from a transmitting node within the plurality of nodes to a sub-plurality of receiving nodes within the plurality of nodes;
  receiving a plurality of response signals from the sub-plurality of receiving nodes wherein each response signal includes a bit-loading modulation scheme determined by a corresponding receiving node;
  determining the common bit-loading modulation scheme from the received plurality of response signals;
  receiving the probe signal at one receiving node of the plurality of receiving nodes through a channel path of transmission;
  determining the transmission characteristics of the channel path at the one receiving node;
  transmitting a response signal from the one receiving node to the transmitting node; and
  generating the response signal, wherein the response signal utilizes a bit-loading modulation scheme that is generated by the one receiving node in response to determining the transmission characteristics of the channel path;
  wherein the transmission characteristics of the channel path are determined by measuring the bit-error rate ("BER") characteristics of the received probe signal at the one receiving node; and
  wherein determining a common bit-loading modulation scheme includes:
    comparing a plurality of bit-loading modulation schemes from the corresponding received plurality of response signals, and
    determining the common bit-loading modulation scheme in response to comparing the plurality of bit-loaded modulation schemes; and
  wherein the each bit-loading modulation scheme utilizes quadrature amplitude modulation ("QAM").

7. The method of claim 6, wherein each bit-loading modulation scheme is chosen from the group essentially consisting of 64 QAM modulation, 128 QAM modulation, 256 QAM modulation, 512 QAM modulation and 1024 QAM modulation.

8. A non-transitory computer-readable medium having software for determining a common bit-loading modulation scheme for communicating between a plurality of nodes in a broadband cable network ("BCN"), the computer-readable medium comprising:
  logic configured for transmitting a probe signal from a transmitting node within the plurality of nodes to a sub-plurality of receiving nodes within the plurality of nodes;
  logic configured for receiving a plurality of response signals from the subplurality of receiving nodes wherein each response signal includes a bit-loading modulation scheme determined by a corresponding receiving node;
  logic configured for determining the common bit-loading modulation scheme from the received plurality of response signals;
  logic configured for receiving the probe signal at one receiving node of the plurality of receiving nodes through a channel path of transmission;
  logic configured for determining the transmission characteristics of the channel path at the one receiving node;
  logic configured for transmitting a response signal from the one receiving node to the transmitting node;
  logic configured for generating the response signal, wherein the response signal utilizes a bitloading modulation scheme that is generated by the one receiving node in response to determining the transmission characteristics of the channel path; and
  logic configured for transmitting a broadcast signal from the transmitting node to the plurality of receiving nodes, wherein the broadcast signal utilizes the common bit-loaded modulation scheme;
  wherein the transmission characteristics of the channel path are determined by measuring the bit-error rate ("BER") characteristics of the received probe signal at the one receiving node; and
  wherein the logic configured for determining a common bit-loading modulation scheme includes:
    logic configured comparing a plurality of bit-loading modulation schemes from the corresponding received plurality of response signals, and
    logic configured determining the common bit-loading modulation scheme in response to comparing the plurality of bit-loaded modulation schemes.

9. A non-transitory computer-readable medium having software for determining a common bit-loading modulation scheme for communicating between a plurality of nodes in a broadband cable network ("BCN"), the computer-readable medium comprising:

logic configured for transmitting a probe signal from a transmitting node within the plurality of nodes to a subplurality of receiving nodes within the plurality of nodes;

logic configured for receiving a plurality of response signals from the subplurality of receiving nodes wherein each response signal includes a bit-loading modulation scheme determined by a corresponding receiving node;

logic configured for determining the common bit-loading modulation scheme from the received plurality of response signals;

logic configured for receiving the probe signal at one receiving node of the plurality of receiving nodes through a channel path of transmission;

logic configured for determining the transmission characteristics of the channel path at the one receiving node;

logic configured for transmitting a response signal from the one receiving node to the transmitting node; and logic configured for generating the response signal, wherein the response signal utilizes a bitloading modulation scheme that is generated by the one receiving node in response to determining the transmission characteristics of the channel path;

wherein the transmission characteristics of the channel path are determined by measuring the bit-error rate ("BER") characteristics of the received probe signal at the one receiving node; and wherein the logic configured for determining a common bit-loading modulation scheme includes:
logic configured for comparing a plurality of bit-loading modulation schemes from the corresponding received plurality of response signals, and
logic configured for determining the common bit-loading modulation scheme in response to comparing the plurality of bit-loaded modulation schemes; and wherein the probe signal utilizes a bit-loaded modulation scheme that is capable of being received by all the receiving nodes within the sub-plurality of receiving nodes.

10. A non-transitory computer-readable medium having software for determining a common bit-loading modulation scheme for communicating between a plurality of nodes in a broadband cable network ("BCN"), the computer-readable medium comprising:

logic configured for transmitting a probe signal from a transmitting node within the plurality of nodes to a subplurality of receiving nodes within the plurality of nodes;

logic configured for receiving a plurality of response signals from the subplurality of receiving nodes wherein each response signal includes a bit-loading modulation scheme determined by a corresponding receiving node;

logic configured for determining the common bit-loading modulation scheme from the received plurality of response signals;

logic configured for receiving the probe signal at one receiving node of the plurality of receiving nodes through a channel path of transmission;

logic configured for determining the transmission characteristics of the channel path at the one receiving node;

logic configured for transmitting a response signal from the one receiving node to the transmitting node; and logic configured for generating the response signal, wherein the response signal utilizes a bitloading modulation scheme that is generated by the one receiving node in response to determining the transmission characteristics of the channel path;

wherein the transmission characteristics of the channel path are determined by measuring the bit-error rate ("BER") characteristics of the received probe signal at the one receiving node; and wherein the logic configured for determining a common bit-loading modulation scheme includes:
logic configured for comparing a plurality of bit-loading modulation schemes from the corresponding received plurality of response signals, and
logic configured for determining the common bit-loading modulation scheme in response to comparing the plurality of bit-loaded modulation schemes; and wherein the transmission characteristics of the channel path are determined by logic configured for measuring the signal-to-noise ("SNR") characteristics of the received probe signal at the one receiving node.

11. A non-transitory computer-readable medium having software for determining a common bit-loading modulation scheme for communicating between a plurality of nodes in a broadband cable network ("BCN"), the computer-readable medium comprising:

logic configured for transmitting a probe signal from a transmitting node within the plurality of nodes to a subplurality of receiving nodes within the plurality of nodes;

logic configured for receiving a plurality of response signals from the subplurality of receiving nodes wherein each response signal includes a bit-loading modulation scheme determined by a corresponding receiving node;

logic configured for determining the common bit-loading modulation scheme from the received plurality of response signals;

logic configured for receiving the probe signal at one receiving node of the plurality of receiving nodes through a channel path of transmission;

logic configured for determining the transmission characteristics of the channel path at the one receiving node;

logic configured for transmitting a response signal from the one receiving node to the transmitting node; and logic configured for generating the response signal, wherein the response signal utilizes a bitloading modulation scheme that is generated by the one receiving node in response to determining the transmission characteristics of the channel path;

wherein the transmission characteristics of the channel path are determined by measuring the bit-error rate ("BER") characteristics of the received probe signal at the one receiving node; and wherein the logic configured for determining a common bit-loading modulation scheme includes:
logic configured for comparing a plurality of bit-loading modulation schemes from the corresponding received plurality of response signals, and
logic configured for determining the common bit-loading modulation scheme in response to comparing the plurality of bit-loaded modulation schemes; and wherein the transmission characteristics of the channel path are determined by logic configured for measuring the product-error rate ("PER") characteristics of the received probe signal at the one receiving node.

12. A broadband cable network ("BCN") for determining a common bitloading modulation scheme for communicating between a plurality of nodes in the BCN, the BCN comprising:

a) a transmitting node within the plurality of nodes, the transmitting node capable of sending a probe signal;

b) a sub-plurality of receiving nodes within the plurality of nodes wherein the subplurality of receiving nodes are capable of transmitting a sub-plurality of response signals in response to receiving the probe signal, wherein the sub-plurality of response signals includes a plurality of bit-loading modulation schemes, wherein each bit-loading modulation scheme of the plurality of bit-loading modulation schemes is determined by a receiving node within the sub-plurality of receiving nodes; and wherein the transmitting node is capable of determining the common bit-loading modulation scheme from the sub-plurality of response signals; and wherein a receiving node within the sub-plurality of receiving nodes is capable of:

receiving the probe signal at the receiving node through a channel path of transmission;

determining the transmission characteristics of the channel path at the receiving node;

transmitting a response signal, of the sub-plurality of response signals, from the receiving node to the transmitting node;

determining the transmission characteristics of the channel path by measuring the bit error rate ("BER") characteristics of the received probe signal at the one receiving node;

generating the response signal, wherein the response signal utilizes a bit-loading modulation scheme that is generated by the receiving node in response to determining the transmission characteristics of the channel path; and determining the transmission characteristics of the channel path by measuring the signal-to-noise ("SNR") characteristics of the received probe signal at the receiving node;

wherein the transmitting node is capable of determining a common bit-loading modulation scheme by:

comparing a plurality of bit-loading modulation schemes from the corresponding received plurality of response signals, and determining the common bit-loading modulation scheme in response to comparing the plurality of bit-loaded modulation schemes.

13. A broadband cable network ("BCN") for determining a common bitloading modulation scheme for communicating between a plurality of nodes in the BCN, the BCN comprising:

a) a transmitting node within the plurality of nodes, the transmitting node capable of sending a probe signal;

b) a sub-plurality of receiving nodes within the plurality of nodes wherein the subplurality of receiving nodes are capable of transmitting a sub-plurality of response signals in response to receiving the probe signal, wherein the sub-plurality of response signals includes a plurality of bit-loading modulation schemes, wherein each bit-loading modulation scheme of the plurality of bit-loading modulation schemes is determined by a receiving node within the sub-plurality of receiving nodes; and wherein the transmitting node is capable of determining the common bit-loading modulation scheme from the sub-plurality of response signals; and wherein a receiving node within the sub-plurality of receiving nodes is capable of:

receiving the probe signal at the receiving node through a channel path of transmission;

determining the transmission characteristics of the channel path at the receiving node;

transmitting a response signal, of the sub-plurality of response signals, from the receiving node to the transmitting node;

determining the transmission characteristics of the channel path by measuring the bit error rate ("BER") characteristics of the received probe signal at the one receiving node;

generating the response signal, wherein the response signal utilizes a bit-loading modulation scheme that is generated by the receiving node in response to determining the transmission characteristics of the channel path; and determining the transmission characteristics of the channel path by measuring the product-error rate ("PER") characteristics of the received probe signal at the one receiving node; and wherein the transmitting node is capable of determining a common bit-loading modulation scheme by:

comparing a plurality of bit-loading modulation schemes from the corresponding received plurality of response signals, and determining the common bit-loading modulation scheme in response to comparing the plurality of bit-loaded modulation schemes.

14. A broadband cable network ("BCN") for determining a common bitloading modulation scheme for communicating between a plurality of nodes in the BCN, the BCN comprising:

a) a transmitting node within the plurality of nodes, the transmitting node capable of sending a probe signal;

b) a sub-plurality of receiving nodes within the plurality of nodes wherein the subplurality of receiving nodes are capable of transmitting a sub-plurality of response signals in response to receiving the probe signal, wherein the sub-plurality of response signals includes a plurality of bit-loading modulation schemes, wherein each bit-loading modulation scheme of the plurality of bit-loading modulation schemes is determined by a receiving node within the sub-plurality of receiving nodes; and wherein the transmitting node is capable of determining the common bit-loading modulation scheme from the sub-plurality of response signals; and wherein a receiving node within the sub-plurality of receiving nodes is capable of:

receiving the probe signal at the receiving node through a channel path of transmission;

determining the transmission characteristics of the channel path at the receiving node;

transmitting a response signal, of the sub-plurality of response signals, from the receiving node to the transmitting node;

determining the transmission characteristics of the channel path by measuring the bit error rate ("BER") characteristics of the received probe signal at the one receiving node;

generating the response signal, wherein the response signal utilizes a bit-loading modulation scheme that is generated by the receiving node in response to determining the transmission characteristics of the channel path;

wherein the transmitting node is capable of determining a common bit-loading modulation scheme by:

comparing a plurality of bit-loading modulation schemes from the corresponding received plurality of response signals, and determining the common bit-loading modulation scheme in response to comparing the plurality of bit-loaded modulation schemes; and wherein the transmitting node and the receiving nodes are the same type of devices.

15. A broadband cable network ("BCN") for determining a common bitloading modulation scheme for communicating between a plurality of nodes in the BCN, the BCN comprising:
   a) a transmitting node within the plurality of nodes, the transmitting node having means for sending a probe signal; and
   b) a sub-plurality of receiving nodes within the plurality of nodes, wherein the sub-plurality of receiving nodes have means for transmitting a sub-plurality of response signals in response to receiving the probe signal, wherein the sub-plurality of response signals includes a plurality of bit-loading modulation schemes, wherein each bit-loading modulation scheme of the plurality of bit-loading modulation schemes is determined by a receiving node within the sub-plurality of receiving nodes; and
   wherein the transmitting node includes means for determining the common bitloading modulation scheme from the sub-plurality of response signals;
   wherein a receiving node within the sub-plurality of receiving nodes includes:
   means for receiving the probe signal at the receiving node through a channel path of transmission;
   means for determining the transmission characteristics of the channel path at the receiving node; and
   means for transmitting a response signal, of the sub-plurality of response signals, from the receiving node to the transmitting node; and
   wherein the means for determining a common bit-loading modulation scheme includes:
     means for comparing a plurality of bit-loading modulation schemes from the corresponding received plurality of response signals; and
     means for determining the common bit-loading modulation scheme in response to comparing all bit-loading modulation schemes within the plurality of bit-loading modulation schemes.

16. The BCN of claim 15, wherein the receiving node includes means for determining the transmission characteristics of the channel path by measuring the bit error rate ("BER") characteristics of the received probe signal at the one receiving node.

17. The BCN of claim 15, wherein the receiving node includes means for determining the transmission characteristics of the channel path by measuring the signal-to-noise ("SNR") characteristics of the received probe signal at the receiving node.

18. The BCN of claim 15, wherein the transmitting node includes means for determining a common bit-loading modulation scheme.

19. The BCN of claim 15, wherein the transmitting node and the receiving nodes are the same type of devices.

20. A broadband cable network ("BCN") for determining a common bitloading modulation scheme for communicating between a plurality of nodes in the BCN, the BCN comprising:
   means for transmitting a probe signal from a transmitting node within the plurality of nodes to a sub-plurality of receiving nodes within the plurality of nodes;
   means for receiving a plurality of response signals from the sub-plurality of receiving nodes wherein each response signal includes a bit-loading modulation scheme determined by a corresponding receiving node;
   means for determining the common bit-loading modulation scheme from the received plurality of response signals;
   means for receiving the probe signal at one receiving node of the plurality of receiving nodes through a channel path of transmission;
   means for determining the transmission characteristics of the channel path at the one receiving node;
   means for transmitting a response signal from the one receiving node to the transmitting node;
   means for generating the response signal, wherein the response signal utilizes a bit-loading modulation scheme that is generated by the one receiving node in response to determining the transmission characteristics of the channel path; and
   means for transmitting a broadcast signal from the transmitting node to the plurality of receiving nodes, wherein the broadcast signal utilizes the common bit-loaded modulation scheme;
   wherein the one receiving node includes means for determining the transmission characteristics of the channel path by measuring the bit error rate ("BER") characteristics of the received probe signal at the one receiving node; and
   wherein the means for determining a common bit-loading modulation scheme includes:
     means for comparing a plurality of bit-loading modulation schemes from the corresponding received plurality of response signals; and
     means for determining the common bit-loading modulation scheme in response to comparing all bit-loading modulation schemes within the plurality of bit-loading modulation schemes.

21. A broadband cable network ("BCN") for determining a common bitloading modulation scheme for communicating between a plurality of nodes in the BCN, the BCN comprising:
   means for transmitting a probe signal from a transmitting node within the plurality of nodes to a sub-plurality of receiving nodes within the plurality of nodes;
   means for receiving a plurality of response signals from the sub-plurality of receiving nodes wherein each response signal includes a bit-loading modulation scheme determined by a corresponding receiving node;
   means for determining the common bit-loading modulation scheme from the received plurality of response signals;
   means for receiving the probe signal at one receiving node of the plurality of receiving nodes through a channel path of transmission;
   means for determining the transmission characteristics of the channel path at the one receiving node;
   means for transmitting a response signal from the one receiving node to the transmitting node; and
   means for generating the response signal, wherein the response signal utilizes a bit-loading modulation scheme that is generated by the one receiving node in response to determining the transmission characteristics of the channel path;
   wherein the one receiving node includes means for determining the transmission characteristics of the channel path by measuring the bit error rate ("BER") characteristics of the received probe signal at the one receiving node; and
   wherein the means for determining a common bit-loading modulation scheme includes:

means for comparing a plurality of bit-loading modulation schemes from the corresponding received plurality of response signals; and means for determining the common bit-loading modulation scheme in response to comparing all bit-loading modulation schemes within the plurality of bit-loading modulation schemes; and wherein the probe signal utilizes a bit-loaded modulation scheme that is capable of being received by all the receiving nodes within the sub-plurality of receiving nodes.

22. A broadband cable network ("BCN") for determining a common bitloading modulation scheme for communicating between a plurality of nodes in the BCN, the BCN comprising:

means for transmitting a probe signal from a transmitting node within the plurality of nodes to a sub-plurality of receiving nodes within the plurality of nodes;

means for receiving a plurality of response signals from the sub-plurality of receiving nodes wherein each response signal includes a bit-loading modulation scheme determined by a corresponding receiving node;

means for determining the common bit-loading modulation scheme from the received plurality of response signals;

means for receiving the probe signal at one receiving node of the plurality of receiving nodes through a channel path of transmission;

means for determining the transmission characteristics of the channel path at the one receiving node;

means for transmitting a response signal from the one receiving node to the transmitting node; and means for generating the response signal, wherein the response signal utilizes a bit-loading modulation scheme that is generated by the one receiving node in response to determining the transmission characteristics of the channel path;

wherein the one receiving node includes means for determining the transmission characteristics of the channel path by measuring the bit error rate ("BER") characteristics of the received probe signal at the one receiving node; and wherein the means for determining a common bit-loading modulation scheme includes:

means for comparing a plurality of bit-loading modulation schemes from the corresponding received plurality of response signals; and means for determining the common bit-loading modulation scheme in response to comparing all bit-loading modulation schemes within the plurality of bit-loading modulation schemes; and wherein each bit-loading modulation scheme utilizes a quadrature phase shift keying ("QPSK") modulation scheme.

23. A broadband cable network ("BCN") for determining a common bitloading modulation scheme for communicating between a plurality of nodes in the BCN, the BCN comprising:

means for transmitting a probe signal from a transmitting node within the plurality of nodes to a sub-plurality of receiving nodes within the plurality of nodes;

means for receiving a plurality of response signals from the sub-plurality of receiving nodes wherein each response signal includes a bit-loading modulation scheme determined by a corresponding receiving node;

means for determining the common bit-loading modulation scheme from the received plurality of response signals;

means for receiving the probe signal at one receiving node of the plurality of receiving nodes through a channel path of transmission;

means for determining the transmission characteristics of the channel path at the one receiving node;

means for transmitting a response signal from the one receiving node to the transmitting node; and means for generating the response signal, wherein the response signal utilizes a bit-loading modulation scheme that is generated by the one receiving node in response to determining the transmission characteristics of the channel path;

wherein the one receiving node includes means for determining the transmission characteristics of the channel path by measuring the bit error rate ("BER") characteristics of the received probe signal at the one receiving node; and wherein the means for determining a common bit-loading modulation scheme includes:

means for comparing a plurality of bit-loading modulation schemes from the corresponding received plurality of response signals; and means for determining the common bit-loading modulation scheme in response to comparing all bit-loading modulation schemes within the plurality of bit-loading modulation schemes; and wherein the each bit-loading modulation scheme utilizes quadrature amplitude modulation ("QAM") scheme.

24. The BCN of claim 23, wherein each bit-loading modulation scheme is chosen from the group essentially consisting of 64 QAM modulation, 128 QAM modulation, 256 QAM modulation, 512 QAM modulation and 1024 QAM modulation.

* * * * *